United States Patent
Parthasarathy

(10) Patent No.: US 12,469,313 B2
(45) Date of Patent: Nov. 11, 2025

(54) LABEL FREE CELL SORTING

(71) Applicant: ASTRIN BIOSCIENCES, INC., Excelsior, MN (US)

(72) Inventor: Jayant Parthasarathy, Excelsior, MN (US)

(73) Assignee: Astrin Biosciences, Inc., St. Paul, MN (US)

( * ) Notice: Subject to any disclaimer, the term of this patent is extended or adjusted under 35 U.S.C. 154(b) by 551 days.

(21) Appl. No.: 17/879,929

(22) Filed: Aug. 3, 2022

(65) Prior Publication Data

US 2023/0040252 A1 Feb. 9, 2023

Related U.S. Application Data

(60) Provisional application No. 63/229,175, filed on Aug. 4, 2021.

(51) Int. Cl.
*G06V 20/69* (2022.01)
*G01N 15/14* (2006.01)
(Continued)

(52) U.S. Cl.
CPC ....... *G06V 20/698* (2022.01); *G01N 15/1433* (2024.01); *G01N 15/1459* (2013.01);
(Continued)

(58) Field of Classification Search
CPC .... G06V 20/698; G06V 10/82; G06V 40/193; G06V 10/25; G06V 40/20; G06V 10/764; G06V 10/774; G06V 10/778; G06V 10/40; G06V 10/454; G06V 20/40; G06V 20/46; G06V 2201/03; G06V 20/69; G06V 10/44; G06V 20/693; G01N 15/1433; G01N 15/1459; G01N 2015/0294; G01N 15/0227; G01N 2015/1413; G01N 2015/1454; G01N 2015/1486; G01N 2015/1493; G01N 2015/1497; G01N 15/1404;
(Continued)

(56) References Cited

U.S. PATENT DOCUMENTS

2007/0215528 A1* 9/2007 Hayenga ........... B01L 3/502761
209/552
2012/0021453 A1* 1/2012 Patra .................... G01N 15/147
435/34
(Continued)

FOREIGN PATENT DOCUMENTS

EP 3995807 A1 5/2002
EP 1998884 A2 12/2008
(Continued)

OTHER PUBLICATIONS

European Search Report issued in EP Application No. 22188040.4, 14 pages, dated Dec. 16, 2022.

*Primary Examiner* — Nimesh Patel
(74) *Attorney, Agent, or Firm* — Lathrop GPM; Lisa Hillman

(57) ABSTRACT

Provided herein are techniques for label free cell sorting. The systems and methods provided herein may use machine learning based image classification techniques to identify cells of interest within a sample of cells. The cells of interest may then be separated from the sample using mechanical, pneumatic, piezoelectric, and/or electronic devices.

14 Claims, 10 Drawing Sheets

(51) Int. Cl.
  *G01N 15/1433* (2024.01)
  *G06T 7/00* (2017.01)
  *G06V 10/774* (2022.01)
  *G01N 15/10* (2006.01)
  *G01N 15/149* (2024.01)

(52) U.S. Cl.
  CPC .......... *G06T 7/0012* (2013.01); *G06V 10/774* (2022.01); *G06V 20/695* (2022.01); *G01N 2015/1006* (2013.01); *G01N 15/149* (2024.01); *G06T 2207/10056* (2013.01); *G06T 2207/20081* (2013.01); *G06T 2207/30024* (2013.01); *G06T 2207/30096* (2013.01); *G06T 2207/30204* (2013.01); *G06T 2207/30242* (2013.01)

(58) Field of Classification Search
  CPC ............. G01N 15/1425; G01N 15/147; G01N 15/1429; G01N 33/49; G01N 15/01; G01N 15/149; G01N 2015/016; G01N 21/6458; G01N 2201/1296; G01N 21/6486; G01N 33/5005; G01N 33/57415; G01N 2015/012; G01N 2015/0233; G01N 2015/0288; G06T 7/0012; G06T 2207/20081; G06T 2207/30024; G06T 2207/10056; G06T 2207/20084; G06T 2207/30096; G06T 2207/10024; G06T 2207/10064; G06T 11/00; G06T 2207/30101; G06T 2207/30104; G06T 7/174; G06T 3/4046; G06T 2219/004; G06T 2207/10016; G06T 2207/10061; G06T 2207/10068; G06T 2207/10072; G06T 2207/10088; G06T 2207/10132; G06T 2207/20036; G06T 2200/04; G06T 2207/30081; G06T 2210/41; G06N 20/00; G06N 3/08; G06N 3/04; G06N 5/048; G06N 20/20; G06N 3/02; G06N 7/01; G06N 3/126; G06N 3/045; G06N 3/088; G06N 3/09; G06N 3/0464; G06N 3/096; G06N 3/048; G06N 3/0475; G06F 3/005; G06F 18/24; G16H 30/20; G16H 50/20; G16H 20/60; G16H 40/67; G16H 50/50; G16H 30/40; G16H 10/60; G16H 20/70; G16H 50/30; G16H 50/70; G03H 1/0443; G03H 2001/005; G03H 1/0866; G03H 2001/0447; G03H 2001/0452; G03H 2001/0883; G03H 2001/0445

See application file for complete search history.

(56) References Cited

U.S. PATENT DOCUMENTS

| | | | |
|---|---|---|---|
| 2016/0103118 A1* | 4/2016 | Teitell | G01B 11/06 702/19 |
| 2016/0210748 A1* | 7/2016 | Nolte | G02B 21/365 |
| 2016/0223453 A1* | 8/2016 | Jalali | G01N 15/1459 |
| 2020/0056142 A1* | 2/2020 | Masaeli | G01N 15/0205 |
| 2020/0182788 A1* | 6/2020 | Shaked | G01N 15/1433 |
| 2020/0231927 A1 | 7/2020 | Masaeli et al. | |
| 2021/0032588 A1 | 2/2021 | Masaeli et al. | |
| 2021/0110536 A1* | 4/2021 | Akazawa | G01N 15/1429 |
| 2022/0081672 A1 | 3/2022 | Masaeli et al. | |
| 2023/0040252 A1* | 2/2023 | Parthasarathy | G06V 20/695 |

FOREIGN PATENT DOCUMENTS

| | | |
|---|---|---|
| WO | 2007109412 A2 | 9/2007 |
| WO | 2020037070 A1 | 2/2020 |
| WO | 2022096315 A1 | 5/2022 |

\* cited by examiner

LABEL FREE CELL SORTING

CROSS REFERENCE TO RELATED APPLICATIONS

This application claims the benefit of U.S. Provisional Application No. 63/229,175, filed Aug. 4, 2021, the entire contents of which are incorporated herewith by reference.

BACKGROUND

Cell sorting currently relies on label-based sorting techniques. For example, cells are tagged using fluorescent anti-body labels and other tags that are specific to a particular surface module present on cells of interest. A narrow stream of a mixture of labeled and unlabeled cells is then passed through a laser in a single file. The labeled cells are identified based on the fluoresce of each cells measured after excitation by the laser and separated from the rest of the mixture. Fluorescence based techniques are expensive and time consuming. The fluorescent anti-body labels are expensive to produce and different labels must be synthesized for each unique cell targeted for separation. Additionally, the fluorescent tagging increases time to the separation process because the cells must be given time to interact with the labels and any excess labels must be removed from the mixture of cells. Moreover, some studies suggest cells can be stressed and/or damaged by the fluoresce labels and/or laser lamination process. Accordingly, there is a well-established need to develop label free methods of cell sorting.

SUMMARY

An embodiment provides a method for sorting cells comprising: receiving image data of a sample including multiple cells, the image data including multiple image frames, wherein each of the multiple image frames includes image data of a portion of the multiple cells included in the sample; generating a trigger for each of the multiple image frames based on timing data corresponding to a capture time for the image data included in each of the multiple image frames; detecting a frame of interest within the multiple image frames based on an output of a classification model, the frame of interest including a cell of interest; and separating the cell of interest from the multiple cells included in the sample by actuating a mechanical device based on the trigger for the frame of interest. A flow rate for the sample can further be determined; two adjacent image frames for the frame of interest can further be determined based on the flow rate and the timing data; the two adjacent image frames can include an image frame captured right before the frame of interest and an image frame captured right after the frame of interest; and the cell of interest can be separated from the multiple cells included in the sample by actuating a mechanical device based on the trigger for the frame of interest and the trigger for each of the two adjacent image frames.

A classification model can further be trained using a training dataset that includes multiple images labeled with different cell types; the output of the classification model can include a prediction for a cell type of one or more cells shown in the image data of the multiple image frames. A classification model can further be trained using a training dataset that includes multiple images labeled as including healthy cells and multiple images labeled as including unhealthy cells, the output of the classification model can include a prediction of a type of one or more cells shown in the image data of the multiple image frames. The mechanical device can include a valve connected to a microfluidic channel. The timing data can include a digital time stamp that indicates the capture time for the image data include in each of the multiple image frames. A frame number for each of the multiple image frames can further be determined. The frame number can identify a position of each of the multiple image frames within a sequence of image frames.

Another embodiment provides a system for sorting cells comprising: a processor and memory connected to each other; a database connected to the processor, wherein the database stores multiple image frames; a camera connected to the processor; a cell counting device connected to the processor; a mechanical device connected to the processor; and a plurality of lines of instructions stored in the memory and executed by the processor of the system that is configured to: acquire, from the camera, image data of a portion of a sample including multiple cells and a marker, the image data including multiple image frames, wherein each of the multiple image frames includes image data of a portion of the multiple cells included in the sample; detect a frame of interest within the multiple image frames based on an output of a classification model, the frame of interest including a cell of interest; detect the marker within the sample; calculate a number of cells between the marker and the cell of interest; receive from the cell counting device a count of cells that pass by the cell counting device after the marker; determine a flow rate for the sample; determine, based on the flow rate and a distance between the cell counting device and the mechanical device, timing data for the cell of interest, wherein the timing data includes a period of time required for the cell of interest to reach the mechanical device after being counted by the cell counting device; and actuate the mechanical device based on the flow rate, the timing data, and the count of cells to separate the cell of interest from the multiple cells included in the sample.

The mechanical device can further include a valve integrated with a microfluidic channel. The cell counting device can further be positioned adjacent to the valve to ensure each cell that reaches the valve is included in the count of cells. The cell counting device can further include a camera configured to capture image data of a portion of the sample that passes by the cell counting device. The processor can further be configured to determine the count of cells based on the image data captured by the camera. The processor can further be configured to train the classification model using a training dataset that includes multiple images labeled with different cell types. The output of the classification model can include a prediction for a cell type of one or more cells shown in the image data of the multiple image frames. The processor can further be configured to train the classification model using a training dataset that includes multiple images labeled as including healthy cells and multiple images labeled as including unhealthy cells. The output of the classification model can include a prediction of a type of one or more cells shown in the image data of the multiple image frames.

Another embodiment provides a method for sorting cells comprising: receiving image data of a sample including multiple cells, the image data including multiple images frames, wherein each of the multiple image frames includes image data of a portion of the multiple cells included in the sample; detecting a frame of interest within the multiple image frames based on an output of a classification model, the frame of interest including a cell of interest; separating a portion of the multiple cells including the cell of interest from the multiple cells based on the detected frame of interest; receiving image data of a diluted sample that includes the portion of the multiple cells including the cell of interest, the image data of the diluted sample including multiple image frames, wherein each of the multiple image frames includes a portion of the diluted sample, and wherein each image frame including image data of the diluted sample includes fewer cells relative to an image frame including image data of the sample; generating a trigger for each of the multiple image frames including image data of the diluted sample based on timing data corresponding to a capture time for the image data included in each of the multiple image frames of the diluted sample; detecting a new frame of interest within the multiple image frames of the diluted sample based on an output of the classification model, the new frame of interest including a cell of interest; and separating the cell of interest from the multiple cells included in the diluted sample by actuating a mechanical device based on the trigger for the new frame of interest.

A flow rate for the diluted sample can further be determined; two adjacent image frames for the new frame of interest can further be determined based on the flow rate and the timing data; the two adjacent image frames can include an image frame captured right before the new frame of interest and an image frame captured right after the new frame of interest; and the cell of interest can be separated from the multiple cells included in the diluted sample by actuating a mechanical device based on the trigger for the new frame of interest and the trigger for each of the two adjacent image frames. The multiple image frames of the diluted sample can include one cell for every three image frames. The mechanical device can be actuated based on the trigger for the new frame of interest and the trigger for each of the two adjacent image frames that separates the cell of interest from each of the multiple cells included in the diluted sample.

Another embodiment provides a method for sorting cells comprising: receiving image data of a sample including multiple droplets, each of the multiple droplets can encapsulate one or more cells, one or more electrostatic particles, and optionally a reference marker, the image data including multiple image frames wherein each of the multiple image frames can include image data of one or more of the multiple droplets included in the sample; detecting a frame of interest within the multiple image frames based on an output of a classification model, the frame of interest can include a target droplet that includes a cell of interest; determining a position of the target droplet relative to a reference marker droplet that includes a marker based on the image data included in the frame of interest; and separating the target droplet from each of the multiple droplets in the sample by actuating an electrical device based on the position of the target droplet relative to the reference marker droplet.

The electrical device can be actuated by exciting the one or more electrostatic particles included in the target droplet to cause the target droplet to deflect in a pre-determined direction. The reference marker can comprise a conductive material. The reference marker droplet can be detected based on an electrical measurement of the conductive material included in the marker. The frame of interest can include image data of the target droplet and the reference marker droplet within a curved microfluidic channel. The classification model can be trained using a training dataset that includes multiple images labeled with different cell types. The output of the classification model can include a prediction for a cell type of one or more cells shown in the image data of the multiple image frames. The classification model can be trained using a training dataset that includes multiple images labeled as including healthy cells and multiple images labeled as including unhealthy cells. The output of the classification model can include a prediction of a type of one or more cells shown in the image data of the multiple image frames.

Another embodiment provides a method for sorting cells comprising: acquiring image data of a portion of a sample including multiple cells and a reference bead, the image data including multiple image frames, wherein each of the multiple image frames includes image data of a portion of the multiple cells included in the sample; detecting a frame of interest within the multiple image frames based on an output of a classification model, the frame of interest including a cell of interest; calculating a number of cells between the reference bead and the cell of interest; receiving from the cell counting device a count of cells that pass by the cell counting device after the reference bead; and separating the cell of interest from the multiple cells included in the sample by actuating a mechanical device based on a comparison between the count of cells and the number of cells between the reference bead and the cell of interest.

The reference bead can comprise a material that is visually different from the cell of interest and the multiple cells included in the sample. The classification model can be trained using a training dataset that includes multiple images labeled with different cell types. The output of the classification model can include a prediction for a cell type of one or more cells shown in the image data of the multiple image frames. The classification model can also be trained using a training dataset that includes multiple images labeled as including healthy cells and multiple images labeled as including unhealthy cells. The output of the classification model can include a prediction of a type of one or more cells shown in the image data of the multiple image frames.

BRIEF DESCRIPTION OF THE DRAWINGS

The accompanying drawings are included to provide a further understanding of the methods and compositions of the disclosure, are incorporated in, and constitute a part of this specification. The drawings illustrate one or more embodiments of the disclosure, and together with the description serve to explain the concepts and operation of the disclosure.

DETAILED DESCRIPTION

The present disclosure provides systems and methods for label free cell sorting. In various embodiments, machine learning techniques are used to identify cells of interest within a sample. Various triggers are used to separate the cells of interest once they are identified.

Overview of Cell Sorting Process

Figure 1:
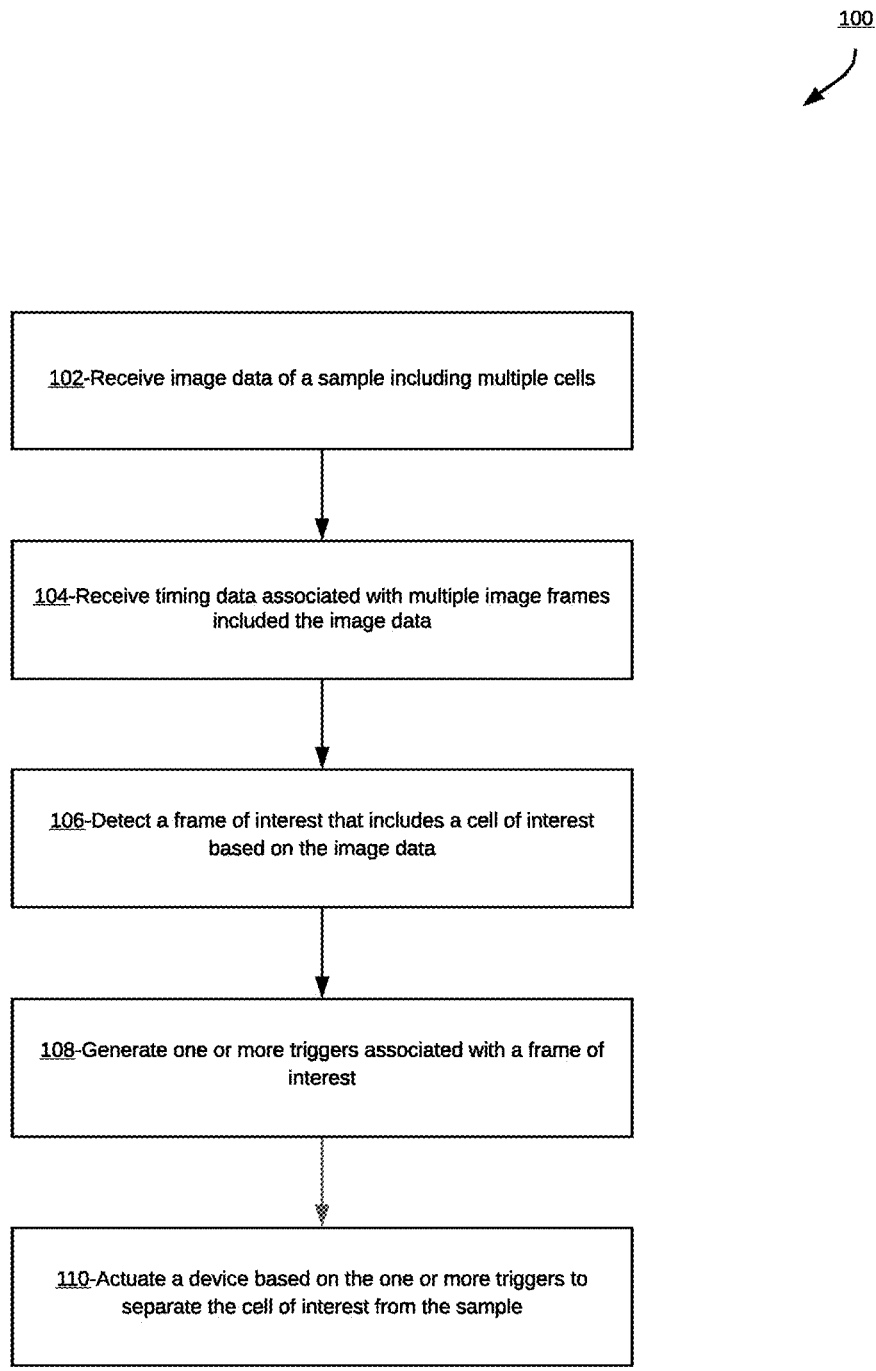
FIG. 1 illustrates an exemplary process 100 for label free cell sorting.
Figure 4:
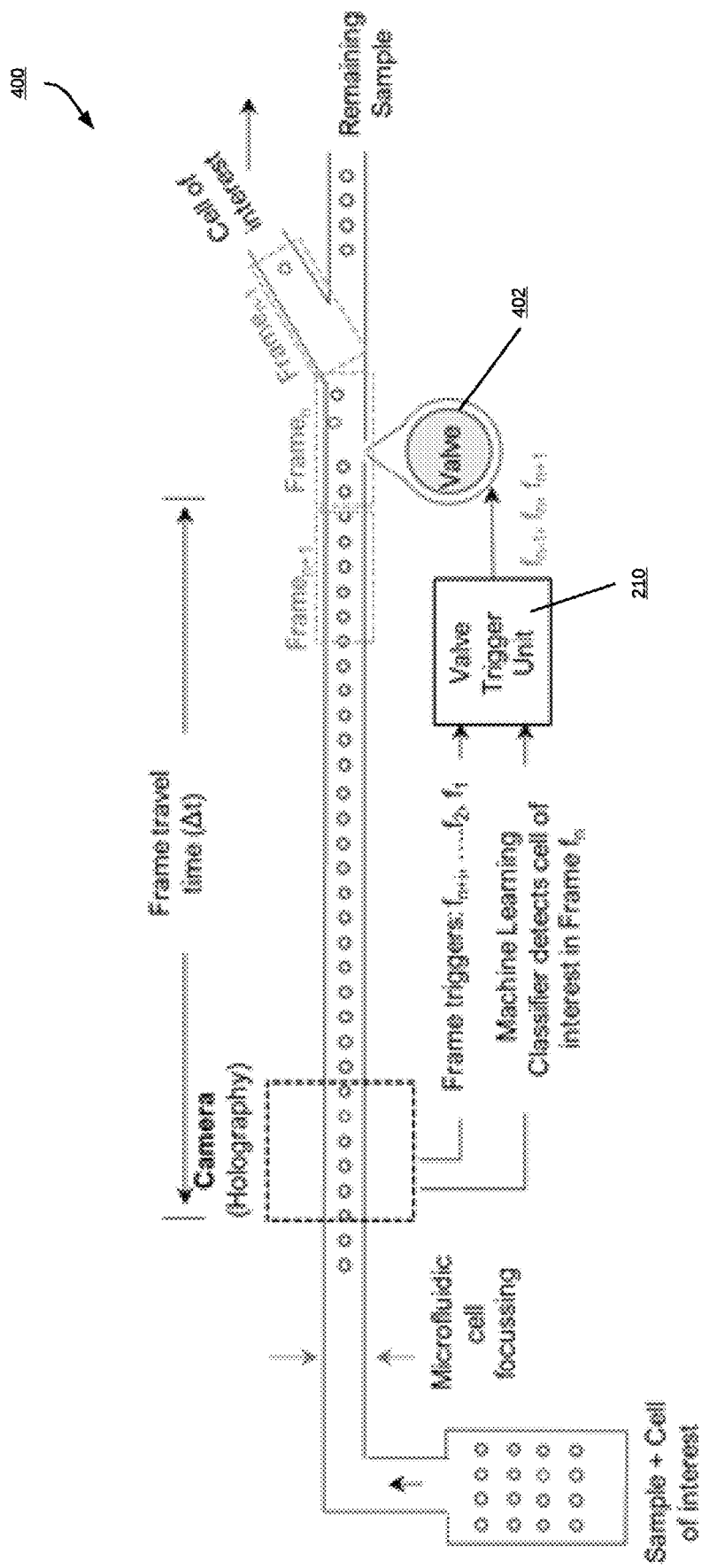
FIG. 4 illustrates an embodiment of an exemplary cell sorting system that includes and electric valve.
Figure 5:
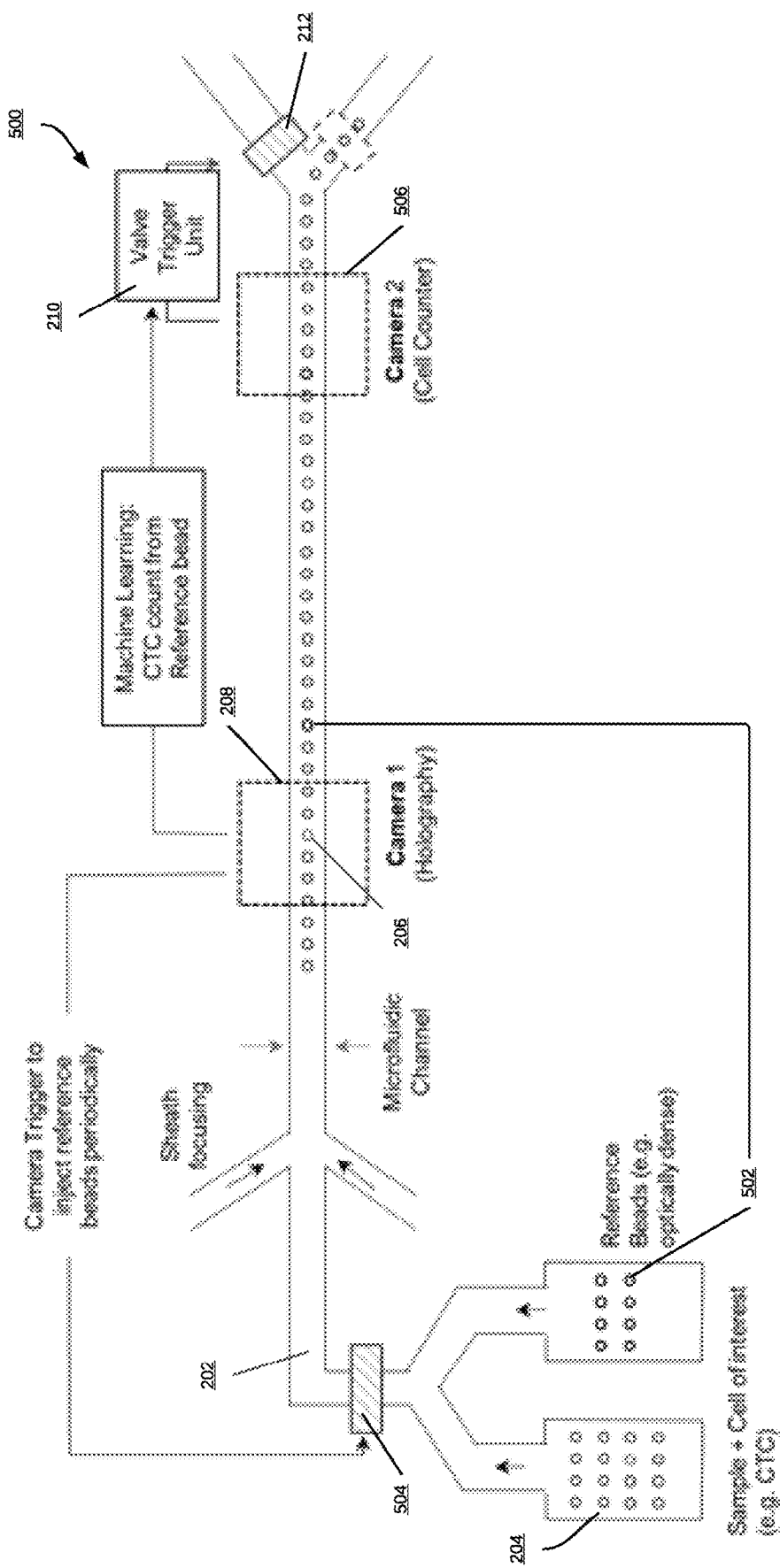
FIG. 5 illustrates an embodiment of an exemplary cell sorting system that includes reference beads.
Figure 7:
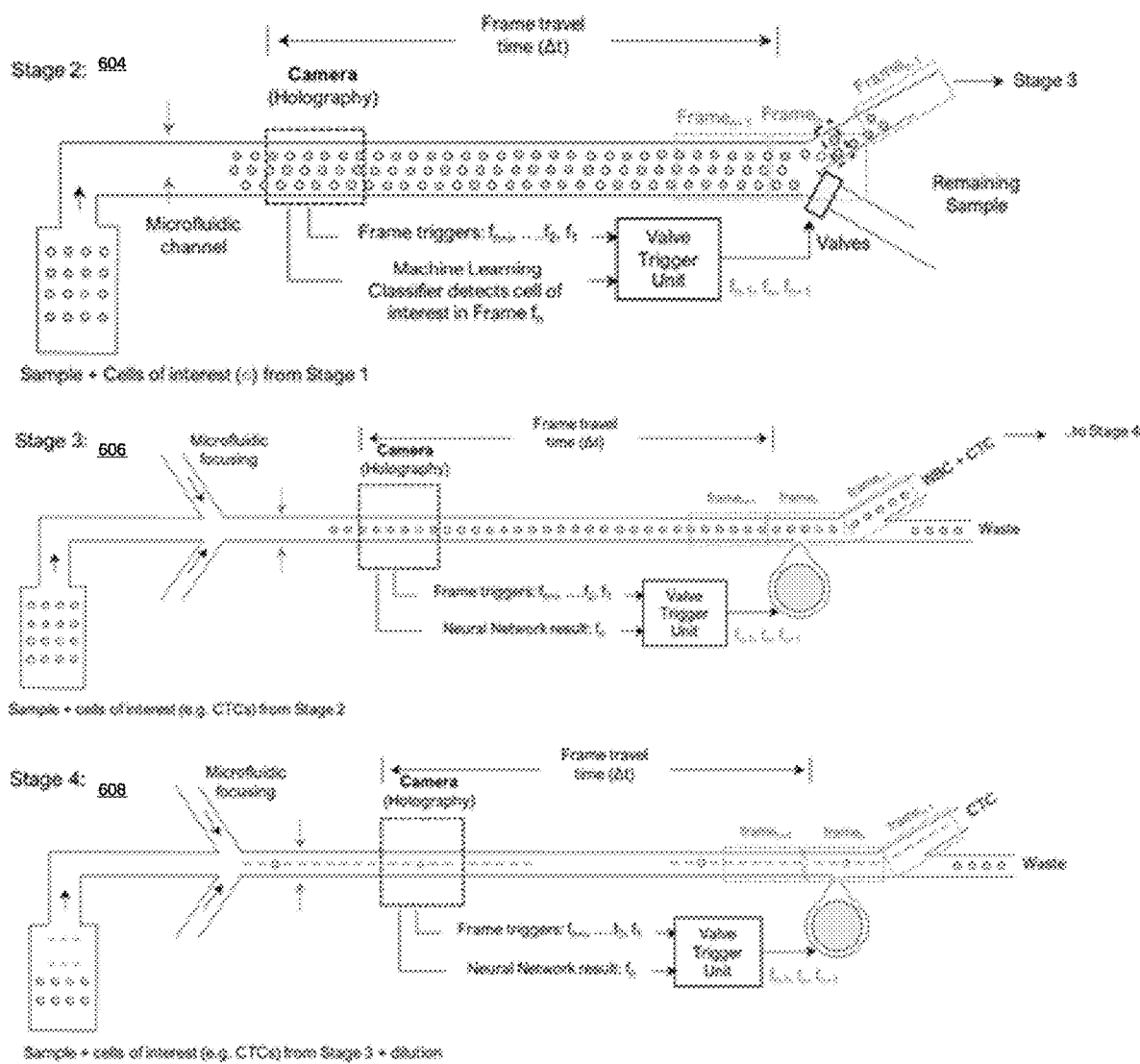
Figure 8:
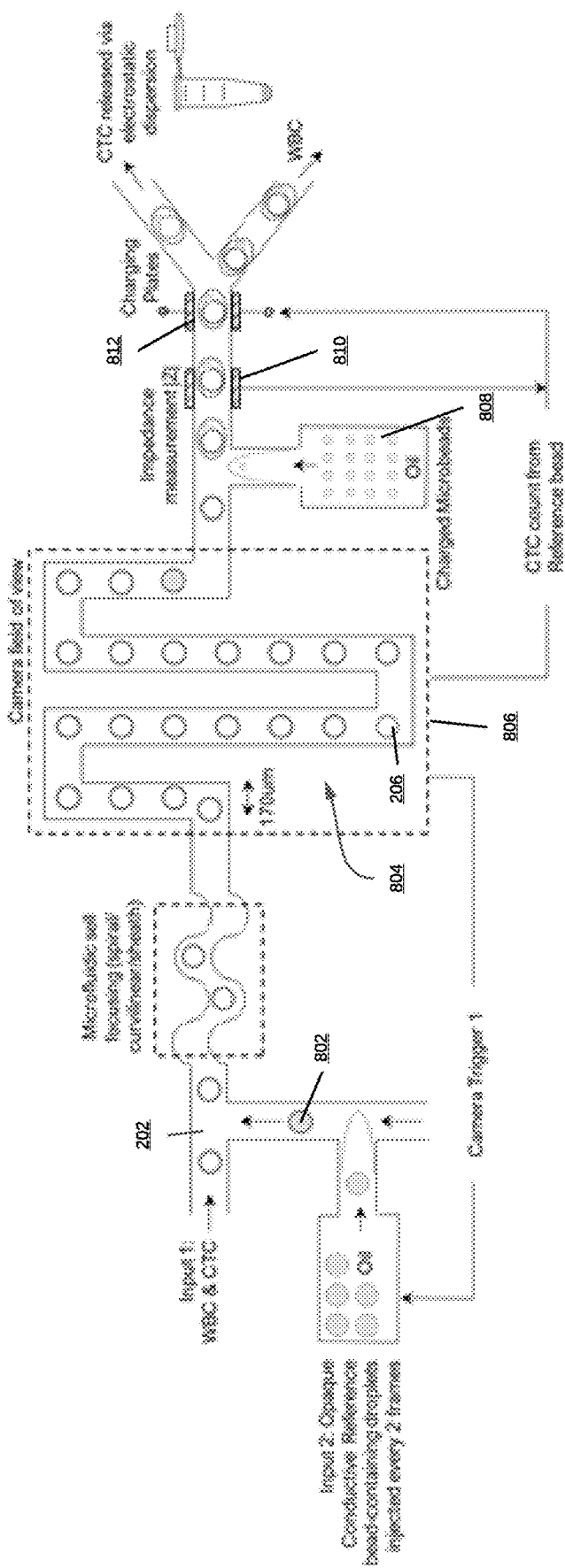
FIGS. 8-9 illustrate an exemplary cell sorting system that includes reference marker droplets.
Figure 9:
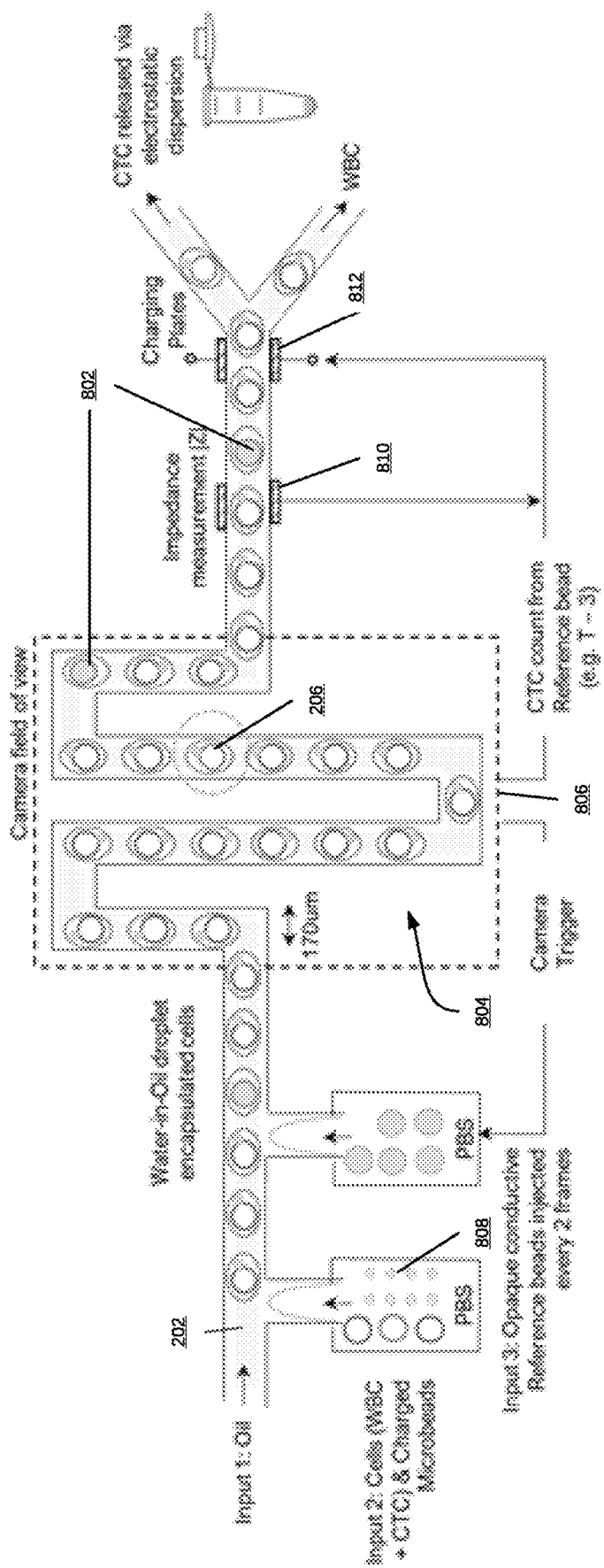

Different approaches can be used to sort cells from a sample including a mixture of different cells. FIGS. 1 and 4 illustrate exemplary systems of cell sorting that use machine learning techniques to identify cells of interest. FIG. 5 illustrates an exemplary system of cell sorting that includes reference beads. FIG. 7 illustrates an exemplary system of cell sorting that may implement a sequential separation process. FIGS. 8-9 illustrate exemplary systems of cell sorting that include reference droplets and charged microbeads.

FIG. 1 is a block diagram illustrating an exemplary process 100 for label free cells sorting. At step 102, image data of a sample including multiple cells is received. The image data may include multiple image frames with each image frame including of a portion of a sample of cells. Each of the multiple image frames may include digital image data of cells included in the sample that is captured by a camera or other image sensor. To capture the image data, the camera may be positioned adjacent to a microfluidic channel or other structure used to transport cells included in the sample. At step 104, a valve trigger unit receives timing data associated with the image frames included in the image data. For example, the timing data may include hardware pulses, time stamp data, and other notifications that correspond to the capture time of each image frame included in the image data. The valve trigger unit may determine the time each image frame included in the image data was captured based on the timing data.

At step 106, the image frames are processed to detect a frame of interest. The frame of interest may include a cell of interest that is included in the sample. Frames of interest may be detected using a machine learning system that generates one or more predictions based on the image data included in each image frame. For example, the machine learning system may include an image classifier that classifies each image frame captured by the camera as including a cell of interest or not including a cell of interest. The machine learning system may be specific to a particular cell of interest and/or sample. For example, the machine learning system may include models trained to identify different types of cells, determine if cells are healthy or not, count the number of cells included in an image frame, and the like.

At step 108, the valve trigger unit may generate one or more triggers associated with the frame of interest. The one or more triggers may be generated based on detecting a frame of interest or some other triggering event. The one or more triggers may be used by the valve trigger device to determine when to actuate a device to separate the cells included in the frame of interest from the other cells included in the sample. The triggers may be based on the timing data including the capture time for each of the frames, the flow rate of the sample through the microfluidic channel, the distance from the camera to the valve or other separating device, the number of cells between the cell of interest and a reference marker, and the like. The valve triggering unit may generate triggers for the frame or interest and/or one or more image frames adjacent to the frame of interest. At step 110, the valve trigger unit actuates a device based on the one or more triggers to separate the cell of interest from the sample. The device used to separate the cell of interest from the sample may be a valve or other mechanical device. Charging plates and/or other pneumatic, piezoelectric, and/or electronic devices may also be used to separate the cells of interest.

Image Classification Techniques for Cell Sorting

Figure 2:
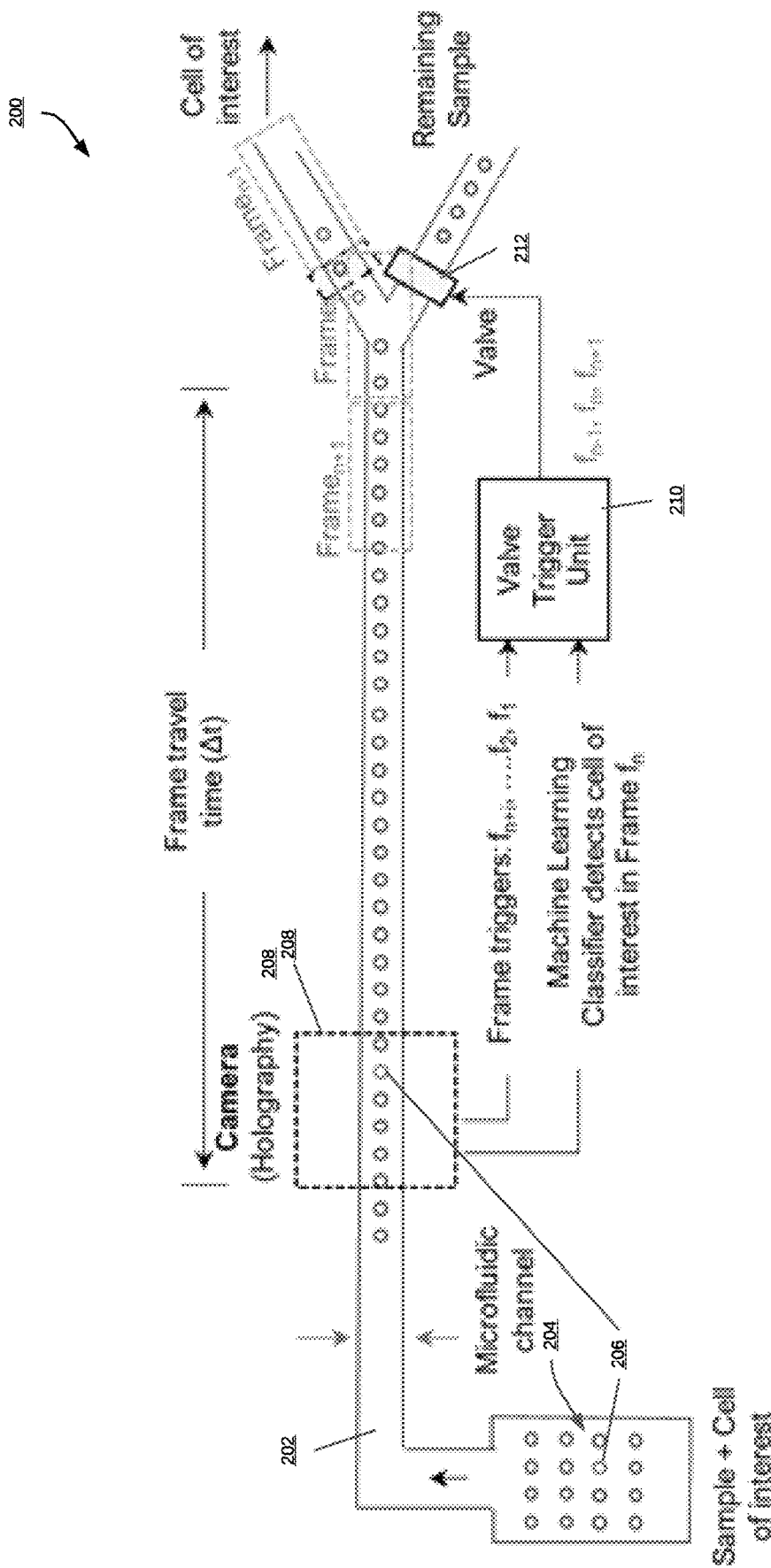
FIG. 2 illustrates an exemplary system 200 that may be used to sort cells.

FIG. 2 illustrates an exemplary system 200 for cell sorting. The system includes a microfluidic channel 202 that receives a sample 204 of cells. The sample 204 may include one or more cells of interest 206 that need to be separated from the other cells included in the sample 204. The cells included in the sample 204 may flow through the microfluidic channel 202 at a pre-determined flow rate. A camera 208 adjacent to the microfluidic channel 202 scans the sample 204 as it flows through the microfluidic channel 202. The camera 208 may include a light source (e.g., laser emitting one or more wavelengths of like, a light emitting diode (LED), and the like) that illuminates the sample 204 and an image sensor that captures image data of the cells included in a portion of the sample 204 that is within the field of view of the camera 208. The camera 208 may continuously capture image data of the sample 204 in order to ensure that each cell included in the sample 204 is included in the image data captured by the camera 208. The camera 208 can be any digital imaging system that captures image data of having a sufficient resolution to identify individual cells. In various embodiments, the camera 208 may be integrated with a microscope of other magnification device. For example, the camera 208 may be included in a digital holographic microscopy device. In various embodiments including the digital holographic microscopy device, the light source may be a laser that illuminates the sample 204 to generate light wave front information that is recorded by a digital image sensor as a hologram.

The captured image data may include a plurality of image frames. Each image frame may include a portion of the sample 204 that was included in the field of view of the camera 208 at a particular point in time when a piece of the image data was captured. The image frames and/or other image data captured by the camera 208 may be processed by a machine learning system to identify the image frames that include the one or more cells of interest 206. The machine learning system may be integrated into the valve trigger unit 210 and/or other component of the system 200 of cell sorting. The machine learning system may also be a standalone hardware and/or software component of system 200. The machine learning system may include one or more machine learning models that may predict whether or not a particular image frame includes at least one of the cells of interest. For example, the machine learning system may include an image classifier or other machine learning model that processes the image frames captured by the camera 208 to determine if a particular frame (fn) includes a cell of interest.

Once the machine learning system identifies the image frames that include the cells of interest 206. The valve trigger unit 210 may operate a valve 212 to separate the cells of interest 206 from the other cells included in the sample 204. To operate the valve 212, the valve trigger unit 210 may generate one or more triggers based on timing data that corresponds to the capture time for image data included in the image frames. To generate the triggers, the valve trigger unit 210 may receive a hardware pulse, time stamp, or other notification every time an image frame is captured by the camera 208. The valve trigger unit 210 may a record a capture time for the image frame as the time that the hardware pulse was received. The time stamp or other notification may also indicate the capture time for the image frame. The hardware pulse, time stamp, and/or other notification may include a frame number or other frame identifier (ID) that identifies the image frame captured at the time of the hardware pulse, time stamp, or other notification was generated. The valve trigger unit 210 may also associate the determined capture time with a frame ID that corresponds to the image frame captured at the particular capture time and save the capture time and associated frame ID as a trigger. The multiple image frames may be captured as a sequence of image frames. The frame IDs for each of the multiple image frames may identify a position of each of the image frames with the sequence of image frames.

The hardware pulse may include an electric and/or mechanical signal generated by the camera 208 that is detected by the valve trigger unit 210. The time stamp may be a software time stamp or other digital time stamp generated by a camera control module or other piece of software used to operate the camera 208. The digital time stamp may be communicated to a valve control module, trigger generation unit, or other data processing component of the valve trigger unit 210. The triggers may be used by the valve trigger unit 210 to determine the capture time of the image data included in each of the image frames. The valve trigger unit 210 may use the triggers to separate a portion of cells from the sample 204 by opening the valve 212 at a particular time. In various embodiments, the number of triggers generated by the valve trigger unit 210 may be counted. For example, the valve trigger unit 210 may count the number of triggers generated for the image frames of the sample 204 captured by the camera 208. The number of triggers may be used to determine a location along the microfluidic channel 202 of a cell of interest of other portion of cells included in the sample 204. The valve trigger unit 210 may actuate the valve 212 based on the number of triggers to separate the portion of cells from the sample. To determine the when to actuate the valve 212, the valve trigger unit 210 may determine the flow rate of the sample 204 of cells through the microfluidic channel 202. The flow rate may be a pre-determined flow rate. The valve trigger unit 210 may also calculate the flow rate based on timing data for one or more components of the system 200. For example, the valve trigger unit 210 may determine the flow rate of the sample 204 based on the time it takes a portion of the sample 204 to move from one point in the field of view of the camera 208 to a second point in the field of view of the camera 208.

To separate the cells of interest 206, image frames that include at least one of the cells of interest 206 are identified by the machine learning system. The valve trigger unit 210 determines the time for when the cells of interest 206 included in identified image frames will reach the valve 212 based on the anticipated flow rate of the cells in the microfluidic channel 202 and the trigger for each of the identified image frames. For example, the machine learning system may determine the image frame having image frame ID 1 includes a cell of interest. The valve trigger unit 210 may determine the capture time for image frame ID 1 based on the trigger generated for this image frame. The distance between the camera 208 and the valve 212 may be fixed so that the valve trigger unit 210 may determine the time required by the sample 204 to flow from the camera 208 to the valve 212 based on the flow rate. For example, if the distance between the camera 208 and the valve is 1 meter (m) and the flow rate is 2 meters per minute (mpm), the valve trigger unit 210 may determine that it takes the sample 204 a time of 30 seconds to travel from the camera 208 to the valve 212. The valve control unit 210 may then actuate the valve 212 at 30 seconds after the capture time included in the trigger for the image frame including the cell of interest 206 (image frame ID 1) to separate the cell of interest 206 included in the image frame from the other cells included in the sample 204.

The valve trigger unit 210 may also determine when to actuate the valve 212 based on a count of image frames. For example, the valve trigger unit 210 may continuously count image frames captured by the camera 208 and determine a number image frames that corresponds to the distance between the camera 208 and the valve 212. The valve trigger unit 210 may then actuate the valve 212 after detecting a frame of interest and counting a number of frames equal to the determined number of image frames.

To determine the number of image frames corresponding to the distance between the camera 208 and the valve 212, the image frames captured during the time it takes a portion of the sample 204 to flow from the camera 208 to the valve 212 may be determined based on the flow rate of the sample 204, the distance between the camera 208 and the valve 212, and the capture time for each image frame. For example, the capture time for each image frame may be determined based on the amount of time between hardware pulses for two consecutive frames (i.e., image frame ID 1 and image frame ID 2), the difference between the capture time of two consecutive frames, and/or timing data extracted from any other notification indicating the capture of multiple image frames. The flow rate of the sample may then be used to determine the distance traveled by the sample 204 each time a new image frame is captured. For example, the flow rate of the sample 204 may be known or determined to be 20 centimeters (cm) per second and the capture time for each frame may be 1 second, therefore, the sample 204 may be determined to travel 20 cm each time a new hardware pulse is received and/or a new image frame is counted. The distance between the camera 208 and the valve 212 may be known or determined to be 500 cm, therefore, the count of image frames required for the sample to travel the 500 cm distance may be 25 image frames. Accordingly, if frame ID 35 is classified as a frame of interest, the valve trigger unit 210 may actuate the valve 212 after receiving the hardware pulse or other notification indicating image frame ID 60 was captured and or counting 25 image frames after frame ID 35. Additionally, for embodiments separating adjacent frames as described below, the valve trigger unit 210 may actuate the valve 212 after the capture of image frame ID 59 and/or counting 24 image frames after frame ID 35 and close the valve 212 after the capture of image frame ID 61 and/or counting 26 image frames after the capture of image frame ID 61.

To ensure that the cells of interest 206 are separated, the valve trigger unit 210 may determine two adjacent image frames to the frame of interest (i.e., the image frame including the cell of interest) based on the triggers. For example, the two adjacent image frames may be the image frame captured immediately before the frame of interest and the image frame captured immediately after the frame of interest. For example, the valve trigger unit 210 may determine the previous frame (fn−1) is the frame ID associated with the capture time that most closely precedes the capture time for the fame of interest (fn) and the next frame (fn+1) is the frame ID associated with the capture time that most closely follows the capture time for the frame of interest. To open the valve 212, the valve control unit 210 may actuate the valve 212 at a period of time after the capture time for the previous frame (fn−1) that corresponds to the travel time of the sample 204 from the camera 208 to the valve 212. To close the valve 212, the valve trigger unit 210 may actuate the valve 212 at a period of time after the capture time for the next frame (fn+1) that corresponds to the travel time of the sample 204 from the camera 208 through the valve 212.

Operating the valve 212 in this manner directs the cells included in the previous frame (fn−1), the frame including the cell of interest (fn), and the next frame (fn+1) to the desired outlet. This action of allowing adjacent image frames (fn−1, fn+1) into the outlets accounts for any scenario where the cell of interest 206 is situated in the edges of a frame. Another advantage with this approach is that it accounts for variability and lag in the time it takes to process machine learning (ML) algorithms. It is typical for state-of-the-art ML algorithms to take between 3-5 ms to process an image (tprocessing) and then actuate microfluidic valves (tvalve). Valves can often be precisely timed, but the uncertainty in ML algorithmic processing to desired levels of accuracy has previously hindered the precise sorting of un-labeled cells using ML-based methods. In the proposed design, the length of the channel is adjusted, such that the time it takes for the frame of interest to travel to the valve (Δr) is longer than the time to process the image and actuate the valves, i.e. Δ>(tprocessing+tvalve). The use of a reference that points to the frame of interest allows for more precise instructions for controlling the valve and sort cells to enable small groups and even individual cells to be separated using the sorting process disclosed herein.

In various embodiments, the concentration of the sample 204 may be sufficiently low so that the cell of interest 206 is not in the edges of a frame. Therefore, the valve trigger unit 210 may divert only the frame with the cell of interest to the desired outlet without either of the adjacent image frames. The valve trigger unit 210 may also actuate the valve 212 to divert cells included in one adjacent image frame or cells included in three or more adjacent image frames depending one or more conditions of the system 200 and/or sorting process. The conditions may include, for example, the concentration of the sample, the flow rate of the sample, the size of the cells, the level or precision required for sorting, and the like.

Figure 3:
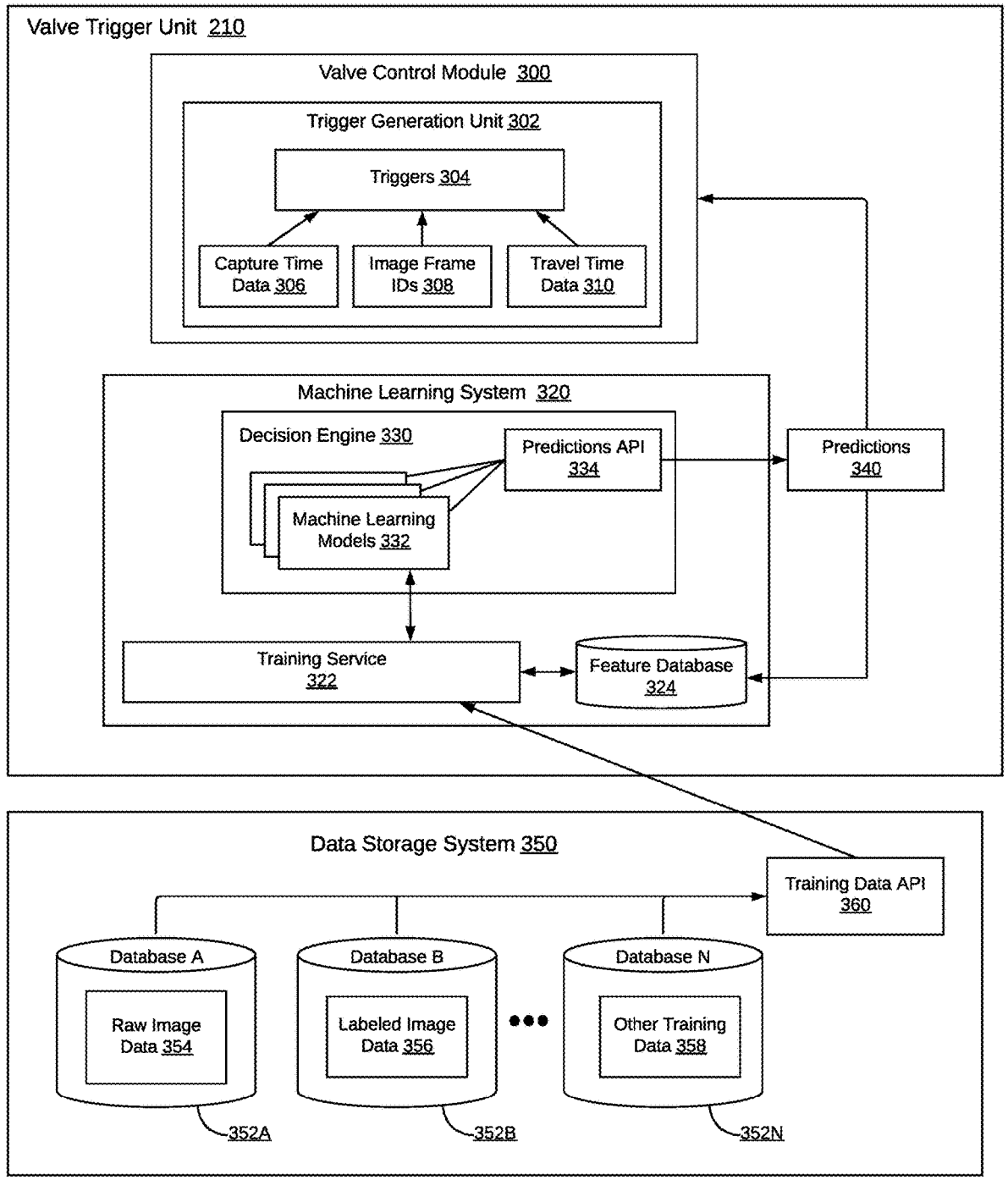
FIG. 3 illustrates more details of the valve trigger unit included in the exemplary system 200.

FIG. 3 illustrates more details of the valve trigger unit 210. The valve trigger unit 210 may include a machine learning system 320 that generates one or more predictions 340 that are used to identify the image frames that include at least one cell of interest. The valve trigger unit 210 may also include a valve control module 300 that operates a valve or other mechanical and/or electrical device used to separate cells of interest from the other cells in the sample. The valve trigger unit 210 may operate any type of valve. For example, in FIG. 2, the valve 212 operated by the valve trigger unit 210 may be a mechanical valve that diverts or otherwise moves cells of interest to a desired outlet. In various embodiments, the mechanical valve may be a membrane style microfluidic valve operated with pneumatic actuation. The membrane style microfluidic valve may be actuated to open or pinch close the microfluidic channel 202 by utilizing air pressure to deflect a membrane on a channel to close the channel opening. Other types and or configurations of mechanical valves may also be used. FIG. 4 illustrates a second embodiment 400 of the system for cell sorting. The embodiment 400 may include a piezoelectric or pneumatic valve 402 controlled by the valve trigger unit 210. For example, the piezoelectric or pneumatic valve 402 may include two pneumatic membrane valves arranged such that one is open while the other remains close to divert the flow of cells one way or the other. The two pneumatic valves may be actuated by using air pressure to shift the position of membrane from covering one channel and leaving the second channel open to covering the second channel and leaving the first channel open. Other types and or configurations of the piezoelectric or pneumatic valve 402 may also be used.

The valve control module 300 may include a trigger generation unit 302 that generates triggers 304 used to control a valve or other mechanical and/or electrical device used to separate cells. The triggers 304 may include location data that tracks the location of the cells included in image frames as the cells travel through the microfluidic channel. The triggers 304 may enable the valve or other mechanical and/or electrical device used to sort the cells to be actuated based on the location of particular cells (e.g., cells of interest) and/or particular frames (e.g., frames including cells of interest) within the microfluidic channel. The trigger generation unit 302 may determine location data included in the triggers 304 based on timing data that may be used to track the location the image frames as the cells included in each frame travel through the microfluidic channel. For example, the location data included in the triggers 304 may include a period of time, a count of image frames, a total travel distance of the frame within the microfluidic channel, and/or any other of piece of data that may be used to determine the location of the frame. For example, the frame location data may include a period of time that elapsed after the frame was captured by the camera, a period of time remaining until the cells included in the frame reach the valve, a number of image frames between a particular image frame and the valve, and the like. The frame location data of the triggers 304 may be determined based on capture time data 306 for each of the frames and travel time data 310 for the portion of cells included in each of the frames. The capture time data 306 may include a time stamp or other notation that identifies a time (e.g., an hour and second value and/or a date value) when each of the image frames was captured by the camera. The travel time data 310 may include a flow rate for the sample and/or other timing or distance metrics calculated based on flow rate. For example, the travel time data 310 may include an estimate of the amount of time remaining before the cells in a particular image frame reach the valve, an estimated distance the cells have traveled since image data of the cells was captured by the camera, and the like. Each piece of capture time data 306 and/or travel time data 310 may include an image frame ID 308 or other identifier for a particular image frame having the particular capture time and/or travel time. The image frame IDs 308 may be included in the triggers 304 to enable the frame tracking unit 302 to track the location of each frame and the cells included in each frame.

As the cells move within the microfluidic channel and the position of the frames change, new triggers 304 may be generated by the trigger generation unit 302. The new triggers 304 may include the updated location data for each frame. The trigger generation unit 302 may continuously generate triggers 304 for each image frame including cells that are in the microfluidic channel. The trigger generation unit 302 may also determine triggers 304 for particular image frames based on a condition or event. For example, the trigger generation unit 302 may determine triggers 304 for image frames classified as including one or more cells of interest in predictions 340 generated by the machine learning system 320.

The machine learning system 320 may include a decision engine 330 and a training service 322. The decision engine 330 may include one or more machine learning models that generate the predictions 340 that identify the image frames that include cells of interest. The training service 322 may train the machine learning models 332 using training data that includes insights and other knowledge used by the machine learning models 332 to make the predictions 340.

To train the machine learning models 332, the training service 322 assembles training datasets that include multiple features. The training datasets may be assembled by selecting features from a feature database 324. The features included in the feature database 324 may include characteristics of image data that includes one or more types of cells. For example, the features may include shapes, colors, locations within the image frame, and other characteristics of image data that includes cells of interest and/or image data that includes other cells included in the sample. The features may be specific to a particular cell of interest and/or sample or may be general features that are informative of many different types of cells of interest and/or samples. The feature database 324 may store different features for multiple cells of interest and/or samples to enable the machine learning system to generate predictions 340 relevant to many different types of cells. For example, the predictions 340 may classify many different cells of interest and other types of cells, identify different properties of cells (e.g., cell size, cell shape, cell type, cell health, and the like), count the number of cells included in an image frame, and make other predictions related to the cells of interest and/or the sample.

The training service 322 may generate the features using data received from a data storage system 350. The data storage system 350 may include multiple databases 352A, ..., 352N that include different data that is relevant to one or more of the predictions 340. For example, database A 352A may include unlabeled images and other raw image data 354 of cells and other objects. The raw image data 354 may be used for unsupervised learning and other machine learning techniques that extract insights from unlabeled data. Database B 352B may include labeled image data 352B that includes a piece of image data and a label associated with the piece of image data. For example, the labeled image data 352B may include an image or other image data of a cell and a label of the type of cell included in the image data. Database N 352N and one or more other databases may also include other training data 358. For example, the other training data 358 may include chemical and/or physical properties of one or more cells of interest or other cells, properties of images captured by different cameras (e.g., resolution, contrast, brightness, magnification, and the like), and other datasets that inform the predictions 340.

The training service 322 may receive training data from one or more of the databases 352A, ..., 352N included in the data storage system 350. To retrieve training data, the training service 322 may request one or more particular datasets from the data storage system 350 by submitting a query or other request to a training data API 360. The training data API 360 may also be programmed to deliver one or more training datasets to the training service on a predetermined schedule to provide the training service 322 any new and/or updated data that may be added to one or more of the databases 352A, ..., 352N over time. The training service 322 may generate features from the training data received from the data storage system 350 using a feature engineering process. For example, the training service 322 may generate a set of features based on the training data. To determine if the features are informative of the prediction target, the training service 322 may train the machine learning models 332 on the set of features and generate test predictions for input test data using the trained models. The training service 322 may compare the test predictions to known outcomes for the test data. For example, the training service 322 may generate test predictions that classify multiple image frames as including at least one cell of interest or not. The test predictions for the image frames in the input test data may then be compared to labels for the same image frames that specify the cells included in each of the image frames included in the input test data. If the test predictions match the labels and/or are within an acceptable similarity threshold to the labels, the training service 322 may select the set of features to use during training. If the test predictions do not match the labels and/or are outside of an acceptable similarity threshold to the labels, the training service 322 may make adjustments based on the incorrect predictions. For example, the training service 322 may generate new features, modify one or more model parameters, and/or modify the training algorithm and/or training hyper parameters used for training based on the incorrect predictions. The training service 322 can re-train the model using the new features, model parameters, hyper parameters, and/or training techniques and retest the predictions generated by the newly trained model against the known labels. The steps of generating new features, training a model, generating predictions, testing the predictions against known labels, and adjusting the features, models, and/or training process based on the incorrect predictions may be repeated unit the accuracy of the predictions generated by the machine learning models 332 improves to within a pre-determined accuracy threshold.

The training service 322 may train multiple models 332 that generate different predictions 340. The features and other training data used to train the models may be specific to a particular prediction. For example, the training service 32 may train a model that classifies image data as including healthy cells (e.g. White Blood Cells, Red Blood Cells, platelets). The features used to train this particular model may include the morphology, size, shape, color, and other features of healthy cells. Another machine learning model trained by the training service 322 may classify image data as including unhealthy cells (e.g. cancer cells or circulating tumor cells). The features used to train the machine learning models may be include the morphology, size, shape, color, and other features of unhealthy cells that are observable in image data. The features may be extracted from multiple images labeled as including one or more different unhealthy cell types (e.g., circulating tumor cells, and other types of cells). Other machine learning models trained by the training service 322 may classify image data as including one or more individual cell types. The features used to train the machine learning models may be extracted from multiple images labeled as including one or more particular cell types. The features used to train the machine learning models may also be extracted from unlabeled data known to include one or more types of cells or other objects.

After training, the machine learning models 332 are deployed to a decision engine 330. To generate predictions 340 using the machine learning models 332, the valve control module 300 submits a prediction request to a prediction API 334 included in the decision engine 330. For example, the prediction request may include an input piece of image data and a desired prediction (e.g., does the input piece of image data included a cell of interest). The predictions API 334 may submit the request to the appropriate machine learning model 332, obtain the prediction result, and return the prediction 240 to the valve control module 300. The valve control module 300 may process the prediction and perform one or more functions based on the prediction. For example, the valve control module 300 may cause the trigger generation unit 302 to generate a trigger in response to receiving a prediction that classifies a piece of input image data as including a cell of interest.

Unlabeled Cell Sorting with Reference Beads

In various embodiments, cells may be sorted using reference beads. The reference beads may help improve the precision of the sorting process, by allowing smaller groups of cells and even individual cells to be separated from the other cells in the sample. FIG. 5 illustrates an exemplary sorting system 500 that includes reference beads 502 that are periodically injected into the sample 204. The reference beads 502 may be made of an opaque or optically dense material that is visually different from the cells of interest and other cells included in the sample 204. The reference beads 502 may also be conductive or have other properties that distinguish the reference beads 502 from the cells in the sample 204. The reference beads 502 act a marker that helps the valve trigger unit 210 determine when to actuate the valve 212 to divert the cells.

To separate cells of interest 206 using the reference beads 502, a camera trigger may actuate an injection apparatus 504 that periodically injects reference beads 502 into the microfluidic channel 202. The injection apparatus 504 may inject the reference beads 502 into the channel as the sample 204 flows through the channel 202 to disperse the reference beads 502 in the sequence of cells flowing through the channel 202. The injection apparatus 504 may inject the reference beads 502 based on a trigger or other event. For example, the injection apparatus 504 may inject the reference beads 502 based on a camera trigger associated with the image frames captured by the camera 208. A camera trigger may actuate the injection apparatus 504 to inject a reference bead 502 after every image frame, every other image frame, every third image frame, or at any other frequency of image frames captured by the camera 208.

A machine learning system may classify the image data included in the image frames to identify image frames that include a cell of interest 206 and/or a reference bead 502. If the machine learning system detects a cell of interest 206 in an image frame, the valve trigger unit 210 may determine the number of cells between the most recent reference bead 502 and the detected cell of interest 206. The number of cells between the reference bead 502 and the cell of interest 206 may be determined based on an analysis of the image data included in the image frames including the cell of interest, the image frames including the reference bead, and the image frames captured between the reference bead 502 and the cell of interest 206. For example, the machine learning system may generate a prediction that includes a count of the cells captured in each image frame. The valve trigger unit 210 may add the predicted cell counts for the image frame including the reference bead, the image frame including the cell of interest, and the image frames captured between the reference bead and the cell of interest to determine the total number of cells between the reference bead 502 and the cell of interest 206.

The number of cells between the cell of interest 206 and the reference bead 502 may also be determined by a cell counting device. The cell counting device may include a second camera 506 adjacent to the valve 212 and some distance along the microfluidic channel 202 after the camera 208. The second camera 506 may capture image data of the sample 204 as the cells near the valve 212. The second camera 506 may be a photoelectric detector or other image sensor configured to capture digital image data. The cell counting device may query the machine learning system to process the image data captured by the second camera 506 to count the number of cells that reach the valve 212. The machine learning system may also process the image data captured by the second camera 506 to detect when the reference bead 502 reaches the valve 212. Once the machine learning system determines the reference bead 502 reaches the valve, the valve trigger unit 210 may determine the count of cells reaching the valve 212 in real time and continuously update the cell count. The valve trigger unit 210 may continuously compare the real time cell count generated based on image data captured by the second camera 506 to the count of cells between the reference bead 502 and the cell of interest 206.

The valve trigger unit 210 may then actuate the valve 212 to direct the cell of interest 206 to the desired outlet based on the flow rate in the microfluidic channel 202, the anticipated time of the cell of interest 206 reaching the valve 212 after being counted by the image data captured by the second camera 506, the original count of cells between the cell of interest 206 and the reference bead 502, and/or the real time cell count after the reference bead is detected by the second camera 506. For example, if the valve trigger unit 210 determines that the flow rate in the microfluidic channel 202 is 1 mpm and the distance between the second camera and the valve 212 is known to be 100 centimeters (cm), the valve trigger unit may determine travel time for a cell between second camera and the valve is 6 seconds. To determine when the actuate the valve 212, the valve trigger unit 210 may multiply the travel time for each cell by the cell count for the number of cells between the reference bead 502 and the cell of interest 206. For example, if the cell count is 30 cells, the valve trigger unit 210 may generate a trigger that actuates the valve 212 at 180$s$ after the reference bead 502 is detected to separate the cell of interest 206. The valve trigger until 202 may actuate the valve again at 186 seconds after the reference bead 502 is detected to resume normal flow of the sample 204 through the microfluidic channel 202.

Sequential Separation

Figure 6:
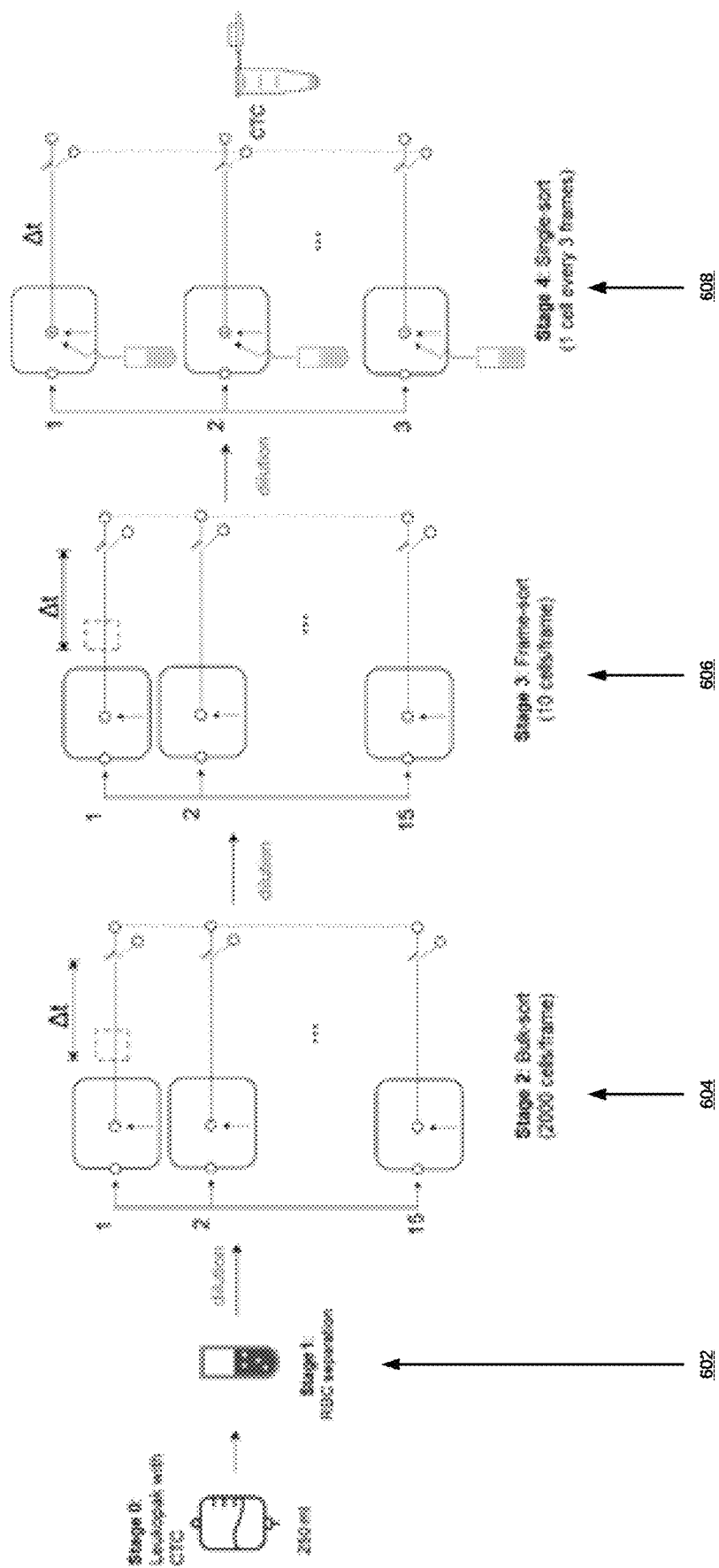
FIGS. 6-7 illustrate an exemplary sequential cell sorting system.

FIGS. 6-7 illustrate sequential sorting techniques that may be implemented using the systems shown above in FIGS. 2 and 4-5. FIG. 6 illustrates an overview of a sequential sorting process that may be used to separate small numbers of cells and/or individual cells from a sample. At stage one 602, a sample of cells is extracted from a liquid or other mixture. The sample of cells is then sorted in stages two through four using a sequential separation process. At stage two 604, the sample of cells is bulk sorted. The cells may be bulk sorted by passing a concentrated sample of cells through the cell sorting system described above. For the bulk sort, each image frame captured by the camera may include 2,000 or more cells. As shown in FIG. 7, the cells included in image frames classified has having a cell of interest (i.e., the frames of interest) are separated using the sorting process described above. For example, the cells included in the frame of interest may be separated from the other cells in the sample using a mechanical, electronic, pneumatic, piezoelectric, and other separation device. In various embodiments, the bulk sorting process may divert three frames for each cell of interest detected by the system so that batches of 6,000 cells are separated by the cell sorting system. The portion of the sample separated during the bulk sort is passed to stage three 606 for frame sorting.

At stage three, the bulk sorted portion of the sample is diluted to reduce the number of cells included in each image frame. For example, the portion of the sample separated by the bulk sorting in stage two 604 may be diluted to reduce the number of cells included in each image frame by a predetermined frame sort reduction factor. For example, the number of cells included in each image frame processed during frame sorting in stage three 606 may be diluted by a reduction factor of 200 so that each image frame of the diluted sample has 200 times fewer cells relative to each image frame of the sample used in stage two 604. Diluting the bulk separated portion of the sample by a reduction factor of 200 reduces the number of cells in each image frame 200 times (e.g., 200×) from 2,000 cells per image frame to 10 cells per frame. To perform the frame sorting process, the diluted sample is sorted again using the sorting process described above. For example, a new frame of interest may be identified using an image classification model and the cells included in the new frame of interest may be separated from the other cells in the sample using a mechanical, electronic, pneumatic, piezoelectric, and other separation device. In various embodiments, the frame sorting process performed in stage three 606 may divert three frames for each cell of interest detected by the cell sorting system to provide batches of 30 cells. The portion of the sample separated during the bulk sort is passed to stage four 608 for individual cell sorting.

At stage four 608, the portion of the sample separated during frame sorting at stage three 606 is diluted to reduce the number of cells included in each image frame. For example, the portion of the sample separated by the frame shorting in stage three 606 may be diluted to reduce the number of cells included in each image frame by a predetermined individual sort reduction factor. For example, the number of cells included in each image frame processed during individual cell sorting in stage four 608 may be diluted by a reduction factor of 30 relative to stage three 606 so that each image frame of the diluted sample has 30 times fewer cells relative to each image frame of the sample used in stage three 606. Diluting the portion of the sample separated during the frame sorting process by a reduction factor of 30 reduces the number of cells in three image frames 30 times (e.g., 30×) from 30 cells per 3 image frames to 1 cell per three image frames. To perform individual cells sorting process, the diluted sample is sorted again using the sorting process described above. For example, a new frame of interest may be identified using an image classification model and the cell included in the new frame of interest may be separated from the other cells in the sample using a mechanical, electronic, pneumatic, piezoelectric, and other separation device. In various embodiments, the individual cell sorting process in stage four 608 may divert three frames for each cell of interest detected by the cell sorting system. After diluting the sample by the individual sort reduction factor, only one cell is included in every three image frames. Therefore, each time the cell sorting system diverts three frames only one cell is separated. Accordingly, the label free four stage sequential separation process described above may be used to separate individual cells.

The exemplary sequential separation process described in FIGS. 6-7 is intended as an illustrative example. The sequential separation processes described herein may include a greater and/or fewer number of stages. The reduction factor for each dilution may be the same and/or different for each stage. For example, the frame sort reduction factor used to prepare the diluted sample for the frame sorting process may be greater than the individual sort reduction factor used to prepare the diluted sample for the individual cell sorting process. The frame sort reduction factor may also be less than and/or the same as the individual sort reduction factor. The reduction factors and/or number of stages included in the sequential separation process may be specific to the cells of interest being separated and/or the samples of cells including the cells of interest. The components of the system used to perform the sorting may also be specific to particular cells of interest and/or samples.

The components of the sorting system may also be different for each stage of the sequential sorting process. For example, the size of the microfluidic channel may be wider in the sorting system used to perform the bulk sorting in order to accommodate more concentrated samples and a higher number of cells included in each image frame. The valves used to divert cells included in frames of interest and/or adjacent image frames may also be different in each of the stages. For example, mechanical valves may be used to divert cells in the bulk sorting process to accommodate larger numbers of cells and/or wider microfluidic channels. The sorting system used to perform the frame sorting process and/or individual cell sorting process may include a piezoelectric or pneumatic valve to provide more precise control of cell diversion and/or accommodate smaller volumes of cells and/or narrower microfluidic channels. The cameras used by the sorting systems to capture image data may also be different for each stage. For example, higher resolution and/or high magnification camera systems may be used to capture image data used to identify cells of interest in the bulk sorting process in order to distinguish cells of interest from a larger number of other cells. The machine learning models used to identify image frames including the cells of interest may also be different for each stage. For example, image classification models used in the bulk sorting stage may be trained on image data captured from a wider camera angle that includes a greater number of cells and image classification models used in the frame sorting and/or individual cell sorting stages may be trained on image data captured from a narrower camera angle having more magnification and/or image frames having a fewer number of cells.

Unlabeled Cell Sorting with Reference Droplets

FIGS. 8 and 9 illustrate exemplary cell sorting systems that include reference droplets 802. The reference droplets 802 (e.g., reference marker droplets) may comprise electrostatic microbeads, reference beads (e.g. opaque, beads comprising a conductive material), and/or other reference markers encapsulated in water droplets (e.g. water droplets in oil for oil based mediums). The reference droplets 802 may be injected into a sample of cells at a pre-determined rate (e.g., 1 droplet for every two image frames). The sample of cells may include unencapsulated cells and/or multiple droplets (e.g., water droplets in oil) with each droplet encapsulating a different cell. The microfluidic channel 202 may be a curved microfluidic channel and/or include a curved section 804 positioned within the field of view 806 of a camera to enable several droplets to be included in each image frame captured by the camera. For example, the curved section 804 may have a serpentine shape that has one or more parallel sections of the microfluidic channel 202 within the field of view 806 of the camera. In various embodiments, the microfluidic channel 202 may be configured to have a width of 170 microns. Other configurations and dimensions of the microfluidic channel 202 may also be used. Image frames included in the curved section 804 of the microfluidic channel are processed to identify a target droplet that includes at least one of the cells of interest 206 and the position of the target droplets relative to one or more reference droplets 802. For example, image frames including target droplets and/or cells of interest 206 may be identified using a machine learning system as described above and the position of the target droplet and/or the cell of interest 206 and one or more reference droplets 802 may be determined based on cell counts as described above.

As the sample flows through the channel, charged microbeads 808 and/or other electrostatic particles may be injected into the droplets that include the cells and/or the reference droplets 802. The charged microbeads 808 may be injected into droplets included in the sample at any point along the microfluidic channel 202. For example, in the sorting system of FIG. 8, the charged microbeads are injected after the camera captures the image data of the sample. In the sorting system of FIG. 9, the charged microbeads 808 are injected before the camera captures image data of the sample. To separate the target droplets and/or cells of interest 206, the location of the reference droplets 802 may be determined using an impedance measuring circuit 810 positioned near a pair of charging plates 812 used to separate the cells. The impendence measuring circuit 810 may distinguish the reference droplets 802 from the cells based on a conductivity measurement, an impedance measurement, and/or any other electrical measurement. To measure impedance, the impedance measuring circuit 810 may generate an electric current at an electrode positioned on one side of the microfluidic channel 202. The amount of electric current passing from the first electrode to a second electrode on the opposite side of the microfluidic channel 202 may then be measured by the impedance measuring circuit 810. The greater the amount of electric current measured at the second electrode the lower the impedance of the material between the electrodes. The reference beads in the reference droplets 802 are more conductive than biological cells. Therefore, the impedance measuring circuit 810 may identify reference droplets 802 based on measuring a lower impedance relative to the cells.

The time required for the reference droplet 802 to travel from the impedance measuring circuit 810 to the charging plates 812 may be determined based on the flow rate inside the microfluidic channel 202 and the distance between the impedance measuring circuit 810 and the charging plates 812 as described above. The amount of time required for a cell of interest 206 to reach the changing plates 812 after being appearing in image data captured by the camera may be determined based on the travel time from the impedance measuring circuit 810 to the charging plates 812 and the number of cells between the reference droplet 802 and the cell of interest 206 as described above. A charging plate trigger unit may generate a trigger that excites the charging plates to cause the charged particles in the droplets passing between the charged plates to deflect in a pre-determined direction (e.g., toward to the desired outlet). The trigger may include a charging time the corresponds to the travel time of the cell of interest from the camera field of view to the charging plates 812. For example, the trigger may include a piece of timing data (e.g., value in minutes and/or seconds or any other period of time) that corresponds to the time it takes a cell of interest 206 to reach the charging plates 812 after the reference droplet 802 closest to the cell of interest 206 passes through the charging plates 812.

Figure 10:
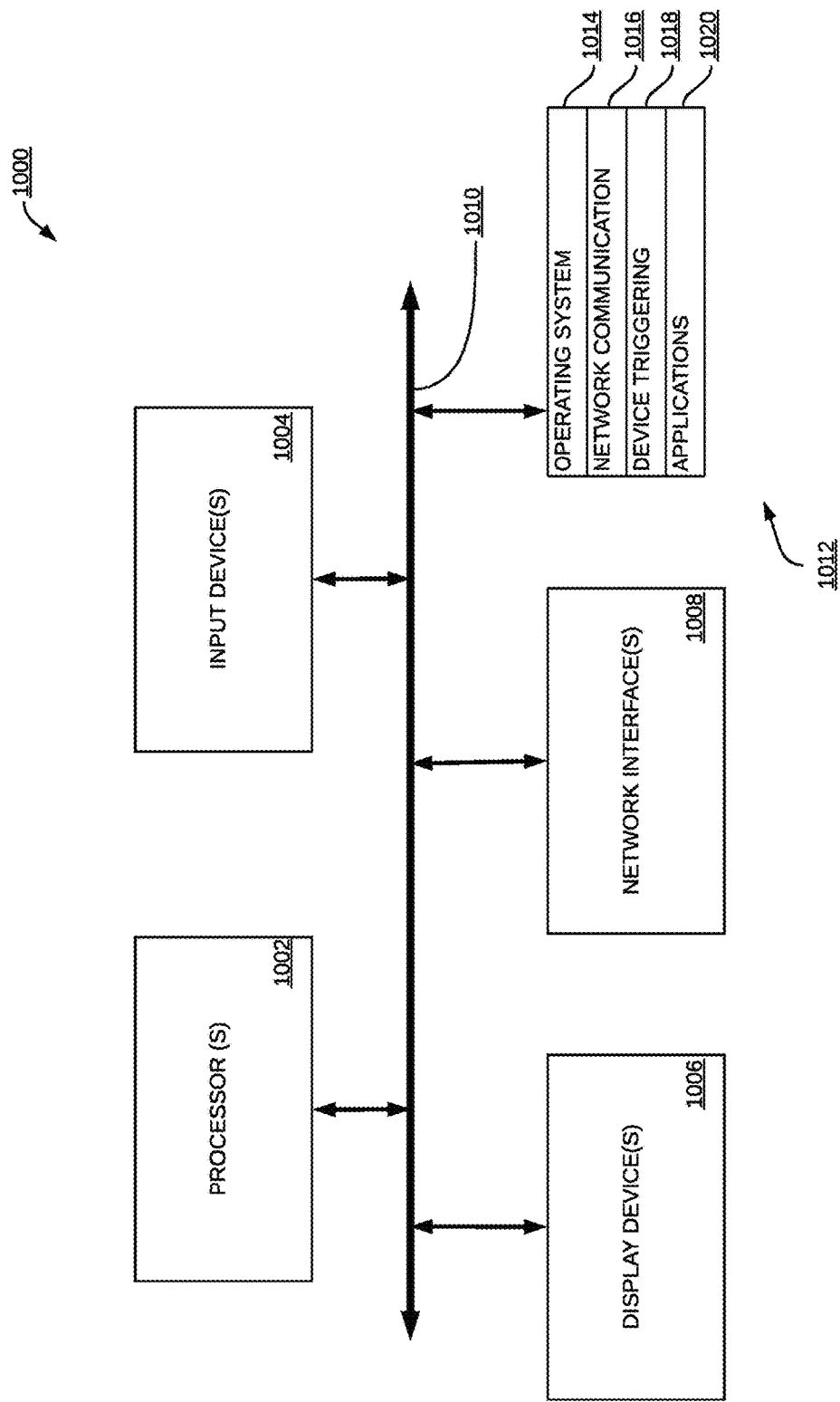
FIG. 10 is a block diagram illustrating an exemplary computing device used to implement that valve trigger unit.

FIG. 10 shows an example computing device according to an embodiment of the present disclosure. The computing device 1000 may be used to implement the valve trigger unit that actuates a valve, pair of charging plates, or other device in order to separate cells of interest from other cells included in a sample. The computing device 1000 may be implemented on any electronic device that runs software applications derived from compiled instructions, including without limitation a microprocessor integrated with a valve or other device, personal computers, servers, mobile devices, smart phones, media players, electronic tablets, etc. In some implementations, the computing device 1000 may include one or more processors 1002, one or more input devices 1004, one or more display devices 1006, one or more network interfaces 1008, and one or more computer-readable mediums 1012. Each of these components may be coupled by bus 1010, and in some embodiments, these components may be distributed among multiple physical locations and coupled by a network.

Display device 1006 may be any known display technology, including but not limited to display devices using Liquid Crystal Display (LCD) or Light Emitting Diode (LED) technology. Processor(s) 1002 may use any known processor technology, including but not limited to graphics processors and multi-core processors. Input device 1004 may be any known input device technology, including but not limited to a keyboard (including a virtual keyboard), mouse, track ball, camera, and touch-sensitive pad or display. Bus 1010 may be any known internal or external bus technology, including but not limited to ISA, EISA, PCI, PCI Express, USB, Serial ATA or FireWire. Computer-readable medium 1012 may be any non-transitory medium that participates in providing instructions to processor(s) 1002 for execution, including without limitation, non-volatile storage media (e.g., optical disks, magnetic disks, flash drives, etc.), or volatile media (e.g., SDRAM, ROM, etc.).

Computer-readable medium 1012 may include various instructions 1014 for implementing an operating system (e.g., Mac OS®, Windows®, Linux). The operating system may be multi-user, multiprocessing, multitasking, multi-threading, real-time, and the like. The operating system may perform basic tasks, including but not limited to: recognizing input from input device 1004; sending output to display device 1006; keeping track of files and directories on computer-readable medium 1012; controlling peripheral devices (e.g., disk drives, printers, etc.) which can be controlled directly or through an I/O controller; and managing traffic on bus 1010. Network communications instructions 1016 may establish and maintain network connections (e.g., software for implementing communication protocols, such as TCP/IP, HTTP, Ethernet, telephony, etc.).

Device triggering instructions 1018 may include instructions that enable computing device 1000 to function as a valve trigger unit and/or to generate triggers that control a device used to separate cells of interest from other cells included in a sample as described herein. Application(s) 1020 may be an application that uses or implements the processes described herein and/or other processes. The processes may also be implemented in operating system 1014. For example, application 1020 and/or operating system may create tasks in applications as described herein.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

Although the present invention has been described with reference to specific details of certain embodiments thereof in the above examples, it will be understood that modifications and variations are encompassed within the spirit and scope of the invention. Accordingly, the methods and compositions are limited only by the following claims.

What is claimed is:

1. A method for sorting cells comprising:
receiving image data of a sample including multiple cells, the image data including multiple image frames, wherein each of the multiple image frames includes image data of a portion of the multiple cells included in the sample;
determining a flow rate for the sample;
generating a trigger for each of the multiple image frames based on timing data corresponding to a capture time for the image data included in each of the multiple image frames;
detecting a frame of interest within the multiple image frames based on an output of a classification model, the frame of interest including a cell of interest;
determining two adjacent image frames for the frame of interest based on the flow rate and the timing data, the two adjacent image frames including an image frame captured right before the frame of interest and an image frame captured right after the frame of interest; and
separating the cell of interest from the multiple cells included in the sample by actuating a mechanical device based on the trigger for the frame of interest and the trigger for each of the two adjacent image frames.

2. The method of claim 1, further comprising:
training the classification model using a training dataset that includes multiple images labeled with different cell types,
wherein the output of the classification model includes a prediction for a cell type of one or more cells shown in the image data of the multiple image frames.

3. The method of claim 1, further comprising:
training the classification model using a training dataset that includes multiple images labeled as including healthy cells and multiple images labeled as including other cells or unhealthy cells, wherein the output of the classification model includes a prediction of a type of one or more cells shown in the image data of the multiple image frames.

4. The method of claim 3, wherein the unhealthy cells are cancer cells.

5. The method of claim 3, wherein the unhealthy cells are circulating tumor cells.

6. The method of claim 1, wherein the mechanical device includes a valve connected to a microfluidic channel.

7. The method of claim 6, wherein the valve is a membrane style microfluidic valve, a piezoelectric valve, or a pneumatic valve.

8. The method of claim 1, wherein the timing data includes a digital time stamp that indicates the capture time for the image data included in each of the multiple image frames.

9. The method of claim 1, further comprising:
determining a number of triggers generated for the multiple image frames; and
actuating the mechanical device based on the number of triggers generated for the multiple image frames.

10. The method of claim 9, wherein the number of triggers comprise location data.

11. The method of claim 10, wherein the location data comprises a period of time, a count of image frames, or total travel distance of a frame.

12. The method of claim 1, further comprising:
determining a frame number for each of the multiple image frames, wherein the frame number identifies a position of each of the multiple image frames within a sequence of image frames.

13. The method of claim 1, wherein the image data is received by a camera and recorded by a digital holographic microscope as a hologram.

14. The method of claim 1, wherein the sample including multiple cells is not labeled.

* * * * *